July 12, 1960 L. M. J. BALFOUR 2,944,589
SEAT STRUCTURE FOR MOUNTING ON THE ROOFS
OF MOTOR CARS AND THE LIKE
Filed Sept. 2, 1958 2 Sheets-Sheet 1

INVENTOR
LIONEL M. J. BALFOUR

BY
Watson, Cole, Grindle &
Watson ATTORNEY

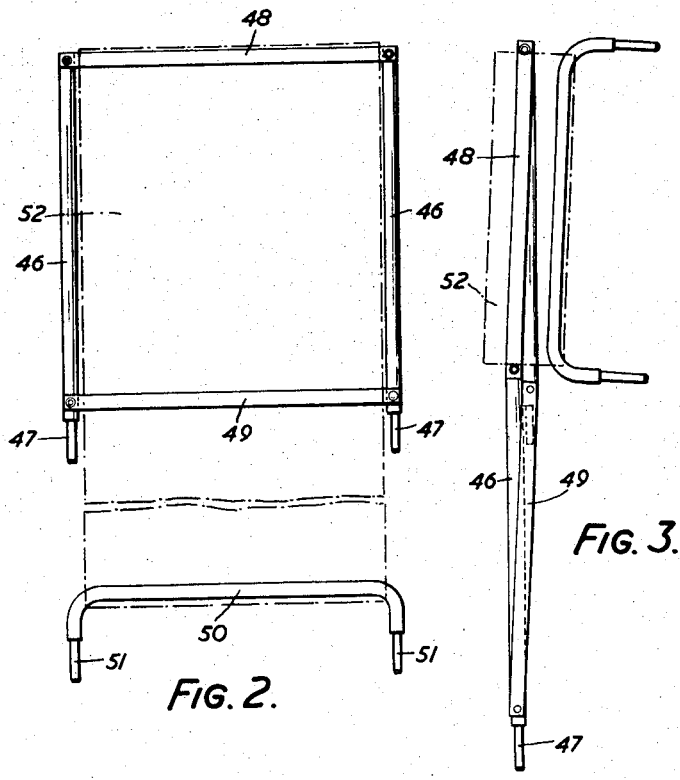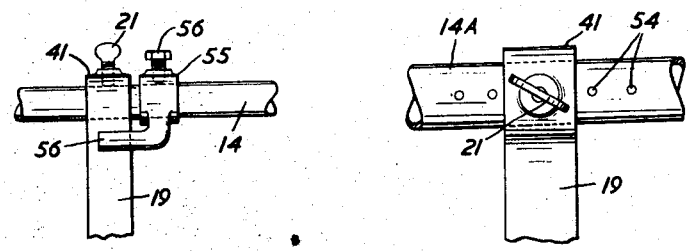

United States Patent Office 2,944,589
Patented July 12, 1960

2,944,589

SEAT STRUCTURE FOR MOUNTING ON THE ROOFS OF MOTOR CARS AND THE LIKE

Lionel Maxwell Joachim Balfour, The Folly Clavenage Lane, Tetbury, England

Filed Sept. 2, 1958, Ser. No. 758,309

Claims priority, application Great Britain Sept. 13, 1957

4 Claims. (Cl. 155—5)

This invention relates to seat-supporting structure and seat assemblies for mounting on the roofs of automobiles and the like.

General types of seat-supporting structure with which the invention is concerned are disclosed in the present applicant's United States patent applications Serial No. 454,262 filed September 7, 1954, now Patent No. 2,853,-119 and Serial No. 746,910 filed July 7, 1958.

It is an object of the invention to provide an improved form of seat for such an assembly which is of simple and inexpensive construction.

Another object is to provide a seat which can be detachably connected to the seat-supporting structure in a simple yet firm manner.

It is a further object of the invention to provide a seat assembly which can readily be folded into a small compass.

A still further object is to provide a seat which is both robust and light in weight.

Yet another object of the invention is to provide positive locking means for tubular main frame members of the seat-supporting structure to prevent rotation of these members under the influence of turning forces applied to these members by the seat or seats.

The invention achieves the above objects by providing the seat or seats with pins which fit detachably into holes in one of the main frame members, and means, which may be pins also, for attachment to the other main frame member.

The positive locking of the tubular main frame members against rotation is conveniently achieved by arm rests provided with pins which fit detachably into holes in these members. Other forms of positive locking are also provided by the invention.

With these and other objects in view, the invention, comprises an arrangement, construction and combination of elements as hereinafter more particularly set forth in the following detailed description of illustrative embodiments, said embodiments being shown in the accompanying drawings wherein:

Figure 2 is a front view showing the various parts of one of these seats;

Figure 3 is a view of the same seat in its collapsed condition;

Figure 4 is a detail showing an alternative form of locking means for one of the main frame members; and Figure 5 shows yet another form of locking means.

Figure 1:
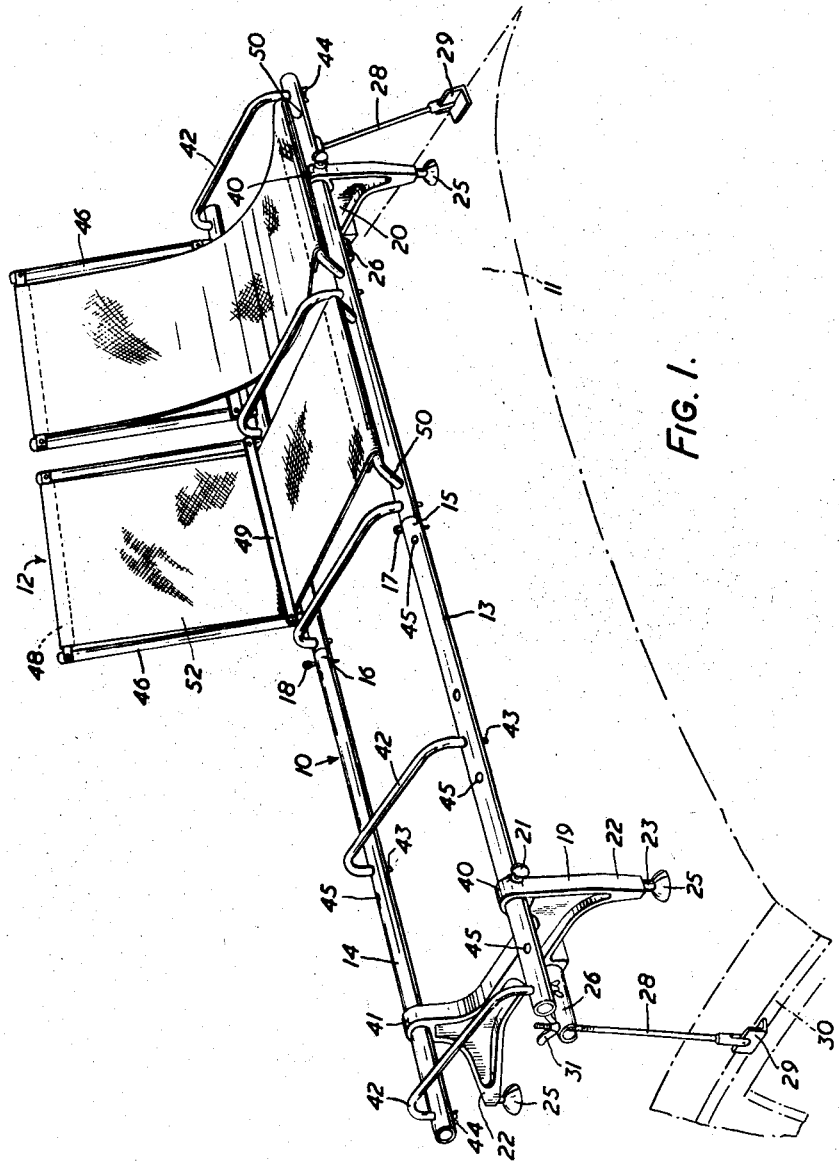
Figure 1 is a perspective view of one form of seat structure embodying the invention, showing two seats in position and illustrating alternative ways in which these seats may be erected.

The seat-supporting structure shown in Figure 1 comprises a supporting frame 10 which extends transversely across the roof 11 of a motor car and which is adapted to carry four seats 12, only two of which are shown in Figure 1.

The frame 10 consists of a front main frame member 13 and a rear main frame member 14 each of which consists of two lengths of tube secured together end to end by spigot and socket connections 15 and 16 provided with locking pins 17 and 18. The frame also has two end frame members 19 and 20 which have holes near their ends formed in upwardly-extending bosses 40 and 41 through which pass the main frame tubes 13 and 14 respectively. Clamping screws 21 are provided in the bosses for locking the end frame members firmly in place on the main frame members 13 and 14 to provide a rigid frame structure.

The end frame members 19 and 20 have legs 22, the rear legs being splayed out rearwardly to provide an extended base for the structure and to eliminate any tendency to tilt over backwards. Into the bottom of each leg 22 is screwed a threaded member 23, the lower end of which is supported by a pad 25 which rests on the flank of the roof 11, i.e. the part of the roof adjacent the edge thereof where it is strongest.

Adjustably mounted in each of the end frame members 19 and 20 is an arm 26, the position of which in the end frame member is adjustable by means of a clamping screw similar to the screws 21 and which is not visible in the drawing. Through the outer end of each arm 26 passes an anchorage member comprising a screwed rod 28 provided at its lower end with a hinged hook 29. The hook is adapted to fit under the edge lip 30 of the roof 11 at a door aperture, and by screwing down a wing nut 31 on the rod 28 the frame is rigidly held on the roof 11. The arm 26 is disposed at a lower level than the main frame tubes 13 and 14 so as to provide a clearance for the wing nut 31 beneath the outermost seats.

Disposed at uniform intervals along the frame are five arm rests 42. These arm rests are provided with downwardly-extending pins 43 which fit detachably into holes formed in the front and rear main frame members 13 and 14. The pins 43 of the two outermost arm rests are threaded at their extremities and are fitted with wing nuts 44. Such wing nuts are not necessary on the three inner arm rests. These arm rests perform the functions of increasing the comfort of the users of the seats, facilitating their movement from one seat to another, and also of preventing rotation of the front and rear main frame members 13 and 14 in the bosses 40 and 41. Although these bosses are provided with clamping screws 21 these provide merely frictional engagement with the main frame tubes and unless they were screwed up very tightly might not be adequate to prevent rotation of the tubes.

Each portion of the tubes 13 and 14 which lies between two arm rests is provided with holes 45 adjacent these arm rests. These holes provide the means whereby the seats are attached to the frame. The holes 45 in the rear main frame member 14 are approximately vertical whereas in the front main frame member 13 are inclined forwards at an angle of, say, 45°.

Each seat consists of two upright back supports 46 having projecting downwardly from their lower ends pins 47 which fit detachably in the holes 45 in the rear frame member 14. Pivotally connected to the back supports 46 at their upper ends is an upper cross bar 48, and pivotally connected to them adjacent their lower ends is a lower cross bar 49. The front of each seat is formed by a front cross member 50, the ends of which are bent downwardly and are provided with pins 51 which fit into the forwardly inclined holes 45 in the front main frame member 13. A seat web 52 of flexible fabric is attached to the upper cross bar 48 and also to the front cross member 50. This seat web can be passed in front of the lower cross bar 49 to form a hammock-type seat as shown in the case of the right-hand seat in Figure 1. Alternatively, it can be passed behind the lower cross bar 49 to provide a seat having a distinct seat and back portions as shown in the case of the left-hand seat in Figure 1. The forward inclination of the holes 45 in the front main frame member 13 and the consequent forward inclination of the front cross member 50 have the effects of increasing the effective length of the web seat portion of the web 52 and also of preventing inadvertent withdrawal of the front cross member. When the seat has been removed from the frame, the back can be collapsed by pivoting the cross bars about the pivotal connections, as shown in Figure 3, the seat web then being wrapped around the collapsed back as shown in the upper part of Figure 3.

In the arrangement so far described the arm rests 42 provide the locking means for preventing rotation of the tubular front and rear main frame members 13 and 14. It is possible, however, to dispense with the arm rests and provide other locking means. One such locking means is shown in Figure 4. In this case the rear frame member 14A is provided with several holes 54 disposed in different positions along the tube, the clamping screw 21 in the boss 41 being screwed in far enough to enter one of these holes. By providing several such holes the distance between the end frame members 19 and 20 can be adjusted. Similar locking means may be provided for the front main frame member if desired.

Another form of locking means is shown in Figure 5. In this case a collar 55 is secured to the tubular member 14 adjacent to the boss 41, and has an extension piece 56 which limits rotation of the tube by engaging a portion of the end frame member 19. The collar 55 is provided with a set screw 56 which can be screwed very tightly against the tubular frame member 14 with the aid of a spanner. Once the correct adjustment has been made, this collar can remain permanently in place, since it does not have to be removed when dismantling the frame structure.

It will be appreciated that various other forms of seat construction may be employed. For instance, a rigid back frame may be provided, consisting of two upright back supports rigidly connected together by an upper cross bar, and if desired by a lower cross bar also. Also, the seat may be provided with rigid side members, rigidly connected together by a front cross member and pivoted to a rigid back so that the seat can be folded flat. In this case, the pins which fits into the front main frame member 13 should be pivoted to facilitate their insertion into the inclined holes 45 in the front main frame member. The pins which fit into the rear main frame member 14 may also be pivotally mounted if other means are provided for holding the back in its upright position. Thus, the side frame members may be equipped with stops which engage the upright members of the seat back so that the force applied to the seat back when the occupant leans against it is resisted by the side frame members instead of by the rear main frame member 14.

A seat having rigid side members has the further advantage that it can be provided with legs which enable it to be used independently of the seat-supporting frame 10. These legs may be detachable. In such a case they may be provided with bored bosses into which fit the downwardly projecting pins of the seat. Such detachable legs may be crossed and pivoted together at the point of intersection, and the legs for the two sides of the seat may, if desired, be connected together by cross bars. Alternatively, separate front and rear legs may be provided. There may be four separate legs, or separate pairs of front legs and rear legs connected together by cross bars. Another way of connecting detachable legs to the seat is to provide the legs with clamping devices which engage the rigid side members of the seat. Alternatively, the legs may be permanently attached to the seat frame, for instance by pivotal connections, the lengths and arrangement of the legs being such that when the seat is mounted on the supporting frame 10 the legs fold away unobtrusively.

In some arrangements in which the seat has rigid side frame members, the arm rests 42 may be dispensed with, since the side frame members of the seats fix the positions of the pins and so prevent rotation of the front and rear frame members 13 and 14.

In a further form of the invention the seat is attached to one of the main frame members, preferably the rear main frame member, by pins in the manner described, while it is attached to the other main frame member by, for instance, a hook which hooks onto this member, or a saddle which fits over this member.

What I claim as my invention and desire to secure by Letters Patent is:

1. A seating structure for mounting on the roof of an automobile, comprising a front transverse main frame member, a rear transverse main frame member, each of said main frame members being tubular, of circular cross section, and having a plurality of diametrically aligned pairs of holes therein, two end frame members each provided with transverse bores of circular cross section which receive said front and rear main frame members and hold said front and rear main frame members parallel at a fixed distance apart, supporting means to support said end frame members on said roof, anchoring means connected to said end frame members for detachable connection to roof side ledges to hold said structure on said roof, at least one seat comprising a back portion provided with downwardly extending pins each detachably received in one of said pairs of holes in said rear main frame member, a seat portion attached to said back portion, and supporting means for said seat portion detachably engaging said front main frame member, and a plurality of arm rests each having a front end and a rear end and pins extending downwardly from said ends detachably received in a pair of said holes in said front and rear main frame members, respectively, said arm rests providing positive locking means preventing rotation of said main frame members in said bores of said end frame members.

2. A seating structure according to claim 1 in which said cross bar extends between said upper ends of said back supports and in which there is a second cross bar extending between said back supports adjacent said lower ends thereof, and said seat web is of sufficient length to pass behind said second cross bar when said seat is mounted on said front and rear main frame members.

3. A seating structure according to claim 2, having pivotal connections between said cross bars and said back supports permitting folding of said seat.

4. A seating structure according to claim 1 wherein said back portion of said seat comprises two upright back supports, each having an upper end and a lower end, and a cross bar connecting said upright back supports, said pins projecting downward from the lower ends of said upright back supports, said supporting means for said seat portion comprises a front cross member having two ends and pins projecting downwardly from said ends of said front cross member, each of said last-mentioned pins being detachably received in one of said pairs of holes in said front main frame member and wherein said seat portion comprises a seat web extending between said cross bar and said front cross member.

References Cited in the file of this patent
UNITED STATES PATENTS

| | | |
|---|---|---|
| 515,387 | White | Feb. 27, 1894 |
| 1,231,318 | Wine | June 26, 1917 |
| 1,505,518 | Workman | Aug. 19, 1924 |
| 2,466,204 | Brown | Apr. 5, 1949 |
| 2,704,569 | Salzer | Mar. 22, 1955 |
| 2,853,119 | Balfour | Sept. 23, 1958 |

UNITED STATES PATENT OFFICE

CERTIFICATION OF CORRECTION

Patent No. 2,944,589                                                  July 12, 1960

Lionel Maxwell Joachim Balfour

It is hereby certified that error appears in the above numbered patent requiring correction and that the said Letters Patent should read as corrected below.

In the heading to the printed specification, line 7, date of priority, for "Sept. 13, 1957" read -- Sept. 3, 1957 --.

Signed and sealed this 25th day of April 1961.

(SEAL)
Attest:

ERNEST W. SWIDER
Attesting Officer

DAVID L. LADD
Commissioner of Patents